(12) United States Patent
Hausman

(10) Patent No.: US 10,699,493 B2
(45) Date of Patent: Jun. 30, 2020

(54) SYSTEM AND METHOD FOR TOLL TRANSACTIONS UTILIZING A DISTRIBUTED LEDGER

(71) Applicant: Hausman Properties, LLC, Houston, TX (US)

(72) Inventor: Brian Hausman, Houston, TX (US)

(73) Assignee: Hausman Properties, LLC, Houston, TX (US)

( * ) Notice: Subject to any disclaimer, the term of this patent is extended or adjusted under 35 U.S.C. 154(b) by 184 days.

(21) Appl. No.: 15/836,846

(22) Filed: Dec. 9, 2017

(65) Prior Publication Data

US 2019/0180519 A1    Jun. 13, 2019

(51) Int. Cl.
*G07B 15/06* (2011.01)
*H04L 9/06* (2006.01)
*H04L 9/32* (2006.01)

(52) U.S. Cl.
CPC .......... *G07B 15/063* (2013.01); *H04L 9/0637* (2013.01); *H04L 9/0643* (2013.01); *H04L 9/3239* (2013.01); *H04L 9/3247* (2013.01); *H04L 2209/38* (2013.01)

(58) Field of Classification Search
CPC ... G07B 15/063; H04L 9/0637; H04L 9/0643; H04L 9/3247
See application file for complete search history.

(56) References Cited

U.S. PATENT DOCUMENTS

| 6,725,202 | B1 | 4/2004 | Hurta et al. |
| 8,473,332 | B2 | 7/2013 | Robinson et al. |
| 9,361,492 | B2 | 6/2016 | Gravelle et al. |
| 9,608,829 | B2 | 3/2017 | Spanos et al. |
| 9,633,238 | B2 | 4/2017 | Gravelle et al. |
| 2008/0120172 | A1* | 5/2008 | Robinson ............. G06Q 20/102 705/13 |
| 2008/0147491 | A1* | 6/2008 | Robinson ............... G06Q 10/02 705/13 |
| 2015/0332283 | A1 | 11/2015 | Witchey |
| 2016/0027229 | A1 | 1/2016 | Spanos et al. |
| 2016/0260169 | A1 | 9/2016 | Arnold et al. |
| 2016/0292672 | A1 | 10/2016 | Fay et al. |
| 2017/0048216 | A1* | 2/2017 | Chow ................ G06Q 20/0655 |
| 2017/0103468 | A1 | 4/2017 | Orsini et al. |

(Continued)

FOREIGN PATENT DOCUMENTS

| EP | 0998073 | A2 * | 5/2000 | ........... G06Q 20/341 |
| EP | 3236374 |  | 10/2017 |  |

*Primary Examiner* — Ryan A Reis

(57) ABSTRACT

The present disclosure relates to implementing an electronic toll data collection management system in a decentralized computing network that employs a distributed ledger. An electronic toll data collection management system may comprise a plurality of nodes, wherein the plurality of nodes are connected to each other over a communication network. Each node may have access to a copy of a distributed ledger, wherein the plurality of nodes is configured to utilize blockchain protocols to verify and record a transaction occurring within the distributed ledger. Data may be recorded as a block, wherein a blockchain is formed by the addition of blocks. Each block may be encrypted and linked to a previous block, wherein a consensus must be reached to update the distributed ledger with the addition of a new block.

17 Claims, 3 Drawing Sheets

(56) References Cited

U.S. PATENT DOCUMENTS

| | | |
|---|---|---|
| 2017/0177898 A1 | 6/2017 | Dillenberger |
| 2017/0212781 A1 | 7/2017 | Dillenberger et al. |
| 2018/0018723 A1* | 1/2018 | Nagla ................ G06Q 20/4014 |

* cited by examiner

SYSTEM AND METHOD FOR TOLL TRANSACTIONS UTILIZING A DISTRIBUTED LEDGER

BACKGROUND OF THE INVENTION

Toll roads may facilitate the passage of a large volume of vehicles every day. Traditionally, there is a toll collection point along a given toll road wherein an operator of a vehicle must pay a toll (i.e., a variable fee) for passage along the road. To reduce time spent at a toll collection point and to increase efficiency, these toll collection points have increasingly become unmanned stations that rely on electronic toll collection systems.

Electronic toll collection systems have become increasingly popular since participation in the system allows an operator to bypass cash-only toll collection points that usually take more time to pass through. An operator of a vehicle may choose to create an account with a company, managing an electronic toll collection system. Upon creating an account, the operator may receive a transmitter to be placed in the vehicle. Typically, as a vehicle gets close to a toll collection point, the transmitter transmits information to a receiver. A camera may verify the information being transmitted by capturing a picture of the vehicle. Both the transmitted information and the captured image may be sent to an information handling system. There may be a central information handling system dedicated to transaction processing. Electronic toll collection systems may operate on four main components: automated vehicle identification, automated vehicle classification, transaction processing, and violation enforcement. Often, companies contract out each of these components to handle separately. Independent companies may not have access to the overarching company's database that manages the electronic toll system, or other independent companies' databases.

Thus, there is a need for a system that utilizes a distributed ledger that may access, process, and manipulate the data acquired at a toll collection point.

BRIEF DESCRIPTION OF THE DRAWINGS

For a detailed description of the preferred examples of the invention, reference will now be made to the accompanying drawings in which.

DETAILED DESCRIPTION OF THE PREFERRED EXAMPLES

The present disclosure relates to implementing an electronic toll data collection management system in a decentralized computing network that employs a distributed ledger. More particularly, examples of a system and method are disclosed for processing vehicle and financial information as an operator passes through a toll collection point. The decentralized computing network may include a plurality of computing systems that act as nodes. Each node may access the distributed ledger. In examples, the distributed ledger may utilize blockchain technology and protocols.

Figure 1:
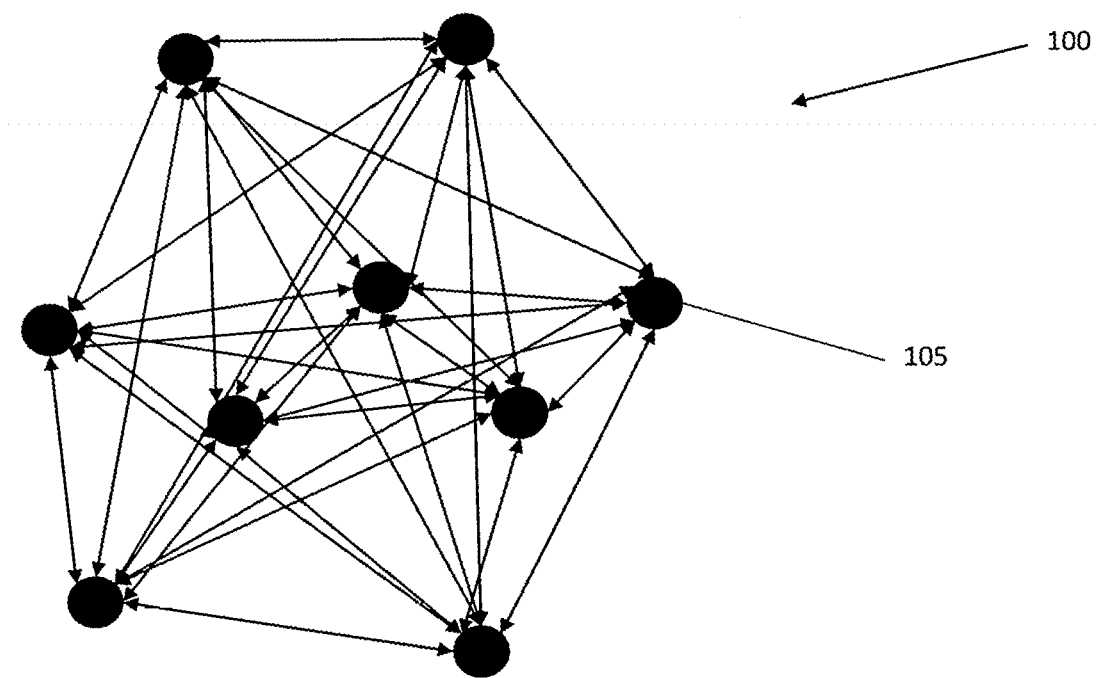
FIG. 1 illustrates an example of a decentralized computing network.

FIG. 1 illustrates an example of a decentralized computing network 100. Decentralized computing network 100 may include a plurality of nodes 105. Node 105 may be operated by an individual, company, and/or other entity. Each node 105 may include a processor, a memory unit, and a bus. The memory unit may be volatile and/or non-volatile. Further hardware and/or software may be used by each node 105. Additionally, any suitable input and output (I/O) devices may be implemented. Without limitation, node 105 may be a computer. Concerning the present disclosure, computer-readable storage mediums may be utilized. Decentralized computing network 100 may connect the plurality of nodes 105 by any form or medium of digital data communication such as a communication network. Without limitation, a communication network may include a local area network ("LAN"), a metropolitan area network ("MAN"), a wide area network ("WAN"), peer-to-peer networks (structured, unstructured, and/or hybrid models), grid computing infrastructures, the Internet, and/or combinations thereof.

In examples, decentralized computing network 100 may utilize blockchain technology and protocols for the distributed ledger. However, not all distributed ledgers may necessarily employ blockchain technology to successfully provide secure and valid achievement of distributed consensus. Without limitation, a blockchain may be one type of data structure considered to be a distributed ledger. A blockchain may be a continuously growing list of records. In examples, the records may be represented as blocks. Each block may include transaction data, a hash pointer, a timestamp, and/or combinations thereof. These blocks may be linked and secured using cryptographic measures. Cryptographic measures may include any suitable mathematical algorithm. In examples, a hash function may be used as the cryptographic measure, wherein the hash function is a mathematical algorithm that takes a data input and generates a fixed output (e.g., a bit string with a fixed length). Hash functions may have pre-image resistance, wherein it may be infeasible to invert without using a brute-force method of trying to compare hashed values of random inputs. Hash functions may be collision resistant, wherein it may be infeasible for two given inputs to produce the same output. In examples, a hash function may be designed to be a one-way function.

The methodology behind blockchain may promote a decentralized network over a peer-to-peer network rather than a central computing system. In examples, the plurality of nodes 105 may own a full copy of the distributed ledger. When a transaction occurs in the distributed ledger, the plurality of nodes 105 may verify the status of the distributed ledger (i.e., the addition of a new block). A consensus among the plurality of nodes 105 may be required to verify the status of the distributed ledger. Any suitable protocol may be used to reach consensus. Without limitation, suitable protocols may be proof of work, proof of stake, proof of authority, and/or combinations thereof. In examples, this may occur automatically and/or continuously. Once consensus has been reached, the distributed ledger may be updated (i.e., the addition of a block).

In examples, digital signatures may be used in the blockchain. In examples, a public and private key may be created using an algorithm and may be related to each other. The public key may be distributed to the plurality of nodes 105. The private key may be kept by an individual node 105 to digitally sign any transaction occurring in the distributed ledger. The receiving party of a transaction that has been signed may verify the data within the transaction by using the public key. One of ordinary skill in the art would recognize that any known digital signature systems may be used without departing from the spirit and scope of the present invention.

Figure 2:
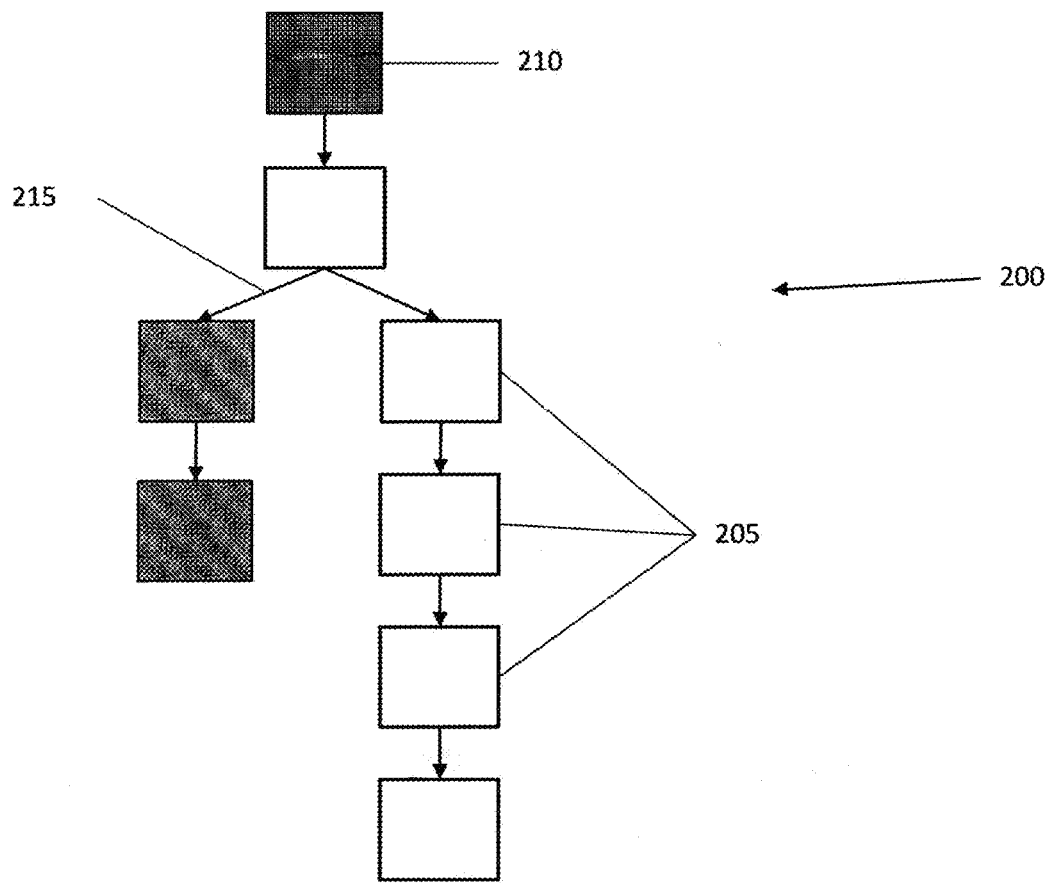
FIG. 2 illustrates an example of a blockchain.

FIG. 2 illustrates an example of a blockchain 200. There may be a plurality of blocks 205 within blockchain 200. In examples, a first block 210 may represent the first data transactions within the distributed ledger. The first block 210 may include any suitable size of data. A hash function may be used to generate an output value (e.g., a "hash") from the first data transactions. For each subsequent block 205 added to blockchain 200, the input to the hash function of the new block may include the previous block's hash and the data transactions represented by the new block. This may produce a system wherein the plurality of blocks 205 are linked, in sequential order, by the previous block's output value of the hash function. The linked blocks 205 may allow the plurality of nodes 105 (referring to FIG. 1) to follow blockchain 200 backwards, from progression, in order to observe and verify data transactions. In examples, any suitable data mining technique may be used to verify and/or create the addition of a block in blockchain 200.

In examples, a fork 215 may be created within blockchain 200. This may be when blockchain 200 diverges into two potential paths of progression. Without limitation, fork 215 may be introduced when two blocks 205 are added that claim the hash of the previous block, when an invalid transaction occurs, and/or when new protocols are implemented. In the example wherein fork 215 is introduced due to two blocks being added, a portion of the plurality of nodes 105 (referring to FIG. 1) may allocate computational efforts in adding blocks onto one side of fork 215. The remaining portion of the plurality of nodes 105 may allocate computational efforts in adding blocks onto the other side of fork 215. One side of fork 215 will inevitably surpass the other in length. The plurality of nodes may come to an agreement that the longer side of fork 215 is the legitimate path of progression of blockchain 200. In examples, the path of progression on the other side of fork 215 may be deemed invalid, may be abandoned, and/or data transactions within the blocks may be lost. In examples with accordance to this disclosure, blockchain 200 may be able to accommodate forks.

In examples, the distributed ledger may be private, public, and/or combinations thereof. The electronic toll data collection management system may have access to information that an operator of a vehicle may not want publicly disclosed (i.e., vehicle information, information on a driver's license, financial information, etc.). There may be different types of nodes 105 (referring to FIG. 1) in the electronic toll data collection management system. There may be limited access within the distributed ledger based on the type of node 105 in operation. Without limitation, different types of nodes 105 that may interact within the electronic toll data collection management system may be the company regulating the toll road, other companies, the general public, the government, and/or combinations thereof. In examples, the distributed ledger may be shared and/or compatible with distributed ledgers and/or databases belonging to other entities. This may allow cross-referencing between entities.

In examples, smart contracts may be used within the distributed ledger. Smart contracts may be computer protocols to execute the agreed upon terms of a contract. Smart contracts may be partially and/or fully self-executing. In examples, smart contracts may be written as code in blockchain 200. Transactions within a smart contract may be reflected in blockchain 200 as the plurality of nodes 105 (referring to FIG. 1) receive the data transactions, verify the information, and update their respective copies of the distributed ledger.

Figure 3:
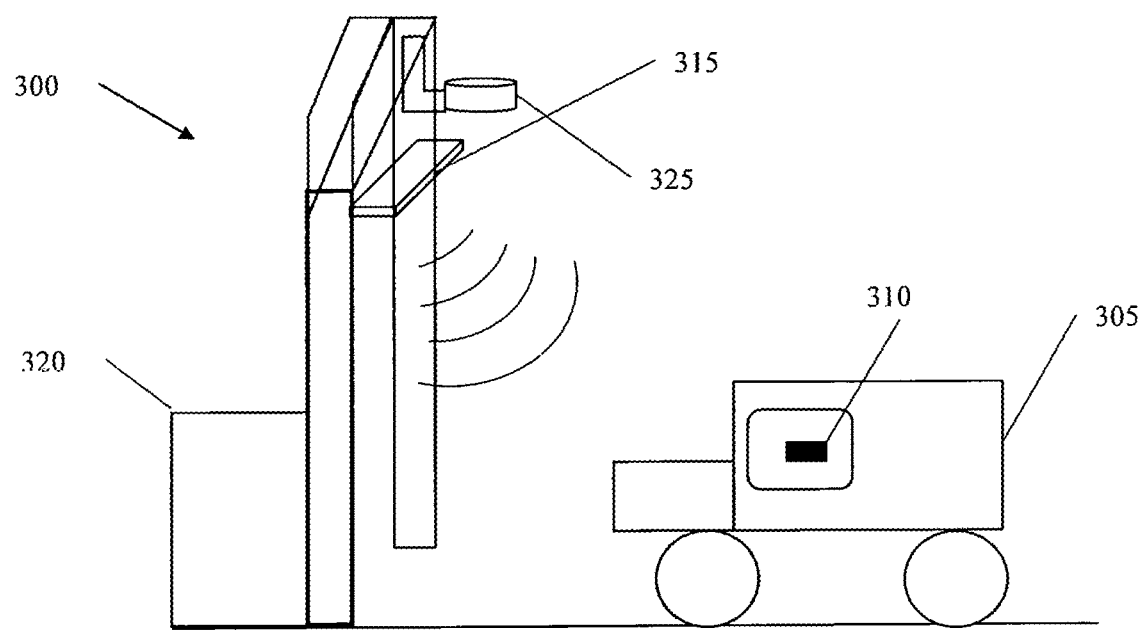
FIG. 3 illustrates an example of a toll collection point.

FIG. 3 illustrates an example of a toll collection point 300. Toll collection point 300 may serve to collect a fee to be paid in order to continue travelling along a path (i.e., a toll road). In examples, an operator of a vehicle 305 may have created an account with a company regulating the toll road. A new block 205 may be added to blockchain 200 (referring to FIG. 2) that reflects the creation of an account between the operator and the company. The account may contain information provided by the operator. Without limitation, the information provided may include vehicle make and model, vehicle registration number, year of vehicle manufacture, license plate number, driver's license number, operator contact information, billing information for the operator, operator permanent address, and/or combinations thereof. Traditionally, this information may be stored in a database at a central computing center. In examples within the present disclosure, this information may be contained in the new block 205, or a subsequent block 205. In examples, the creation of the account may have been done through a smart contract between the operator and the company, wherein the smart contract is recorded in blockchain 200 (referring to FIG. 2). Agreed upon terms may include initially depositing a certain amount of money into the account and debiting the account a certain fee every time the operator passes through toll collection point 300 along a toll road. Further agreed upon terms may include breach-of-contract payments and/or processes. In examples, the smart contract may partially self-execute until the terms have been fulfilled. In exchange for creating an account, the company may provide the operator with a transmitter 310.

Transmitter 310 may be any suitable device capable of producing electromagnetic waves. Transmitter 310 may include and utilize any suitable hardware and/or software to produce electromagnetic waves. The electromagnetic waves may travel at a specified frequency. Transmitter 310 may be any suitable size, height, and/or shape. In examples, transmitter 310 may be in the shape of a card. Transmitter 310 may be placed anywhere within or on vehicle 305. Without limitation, transmitter 310 may use radio-frequency identification (RFID). Transmitter 310 may passively or actively operate. In examples, transmitter 310 may operate to produce an electromagnetic wave after receiving enough energy emitted from a receiver in a certain proximity. In alternative examples, transmitter 310 may include a power source for active operation. Any suitable power source may be used to induce operation of transmitter 310.

As vehicle 305 passes by and/or through toll collection point 300, transmitter 310 may transmit data via electromagnetic waves to a receiver 315. In examples, the transmitted data may be a serial number for the operator's account. In alternative examples, the transmitted data may contain information within the operator's account. There may be a plurality of receivers 315. Receiver 315 may be any suitable size, height, and/or shape. Receiver 315 may process the incoming electromagnetic waves and convert them into electrical currents. Receiver 315 may include and utilize any suitable hardware and/or software to receive and process electromagnetic waves. The electrical currents containing the data transmitted by the electromagnetic waves may travel into a computing system 320.

Computing system 320 may include similar components as node 105 (referring to FIG. 1). Computing system 320 may include a processor, a memory unit, and a bus. The memory unit may be volatile and/or non-volatile. Further hardware and/or software may be used by computing system 320. Additionally, any suitable input and output (I/O) devices may be implemented. Without limitation, computing system 320 may be a computer. Concerning the present disclosure, computer-readable storage mediums may be utilized.

In examples, computing system 320 may act as node 105 (referring to FIG. 1) in the disclosed electronic toll data collection management system. Computing system 320 may broadcast the data received as electrical currents to the distributed ledger. In examples, the plurality of nodes 105 (referring to FIG. 1) may verify and update their respective copies of the distributed ledger, within the electronic toll data collection management system, that the operator of vehicle 305 has passed by and/or through toll collection point 300 at a certain time. The smart contract in place within blockchain 200 (referring to FIG. 2) may partially self-execute when this data is processed. In examples, this self-execution may debit the operator's account a specified amount for the toll fee. The plurality of nodes 105 (referring to FIG. 1) may further verify and update their respective copies of the distributed ledger that the operator's account has been debited by the company regulating the toll road. Concerning the present disclosure, the implementation of the electronic toll data collection management system may negate the need for central databases to store and update a regulating company's customer data.

Toll collection point 300 may further include a camera 325. Camera 325 may take a picture of vehicle 305 as it passes through toll collection point 300. Camera 325 may be any suitable device or sensor, or collection of hardware and/or software, for capturing an image as vehicle 305 passes by. Camera 325 may implement laser scanners. In examples, this picture may be used to verify the information transmitted by transmitter 310. The picture may be sent to computing system 320 to be broadcast to the plurality of nodes 105 (referring to FIG. 1) within the electronic toll data collection management system. The plurality of nodes 105 may verify this transaction and update their respective copies of the distributed ledger.

In examples, an operator may create an account with the regulating company of a toll road but may not receive a transmitter. In this particular example, camera 325 may take a picture of vehicle 305 as it passes through toll collection point 300. The picture may be sent to computing system 320 to be broadcast to the plurality of nodes 105 (referring to FIG. 1) within the electronic toll data collection management system. The plurality of nodes 105 may verify this transaction and update their respective copies of the distributed ledger. In examples, the electronic toll data collection management system may employ automated vehicle identification protocols. The picture taken may be analyzed to extract the license plate number of vehicle 305. A legible license plate number may be extracted from the picture, depending on the quality of the picture. In other examples, a license plate number may not be extracted as outside factors may produce a poor image of vehicle 305 (i.e., inclement weather). A request may be broadcast over the distributed ledger to find the account containing the extracted license plate number. Blockchain 200 (referring to FIG. 2) may be parsed through to find the matching account. The matching account may be debited a specified amount for the toll fee. The plurality of nodes 105 (referring to FIG. 1) may further verify and update their respective copies of the distributed ledger that the matching account has been debited by the company regulating the toll road.

In examples, an operator of vehicle 305 may not have created an account with the company regulating the toll road. Subsequently, the operator may not have obtained a transmitter 310 to transmit data to the electronic toll data collection management system. As the operator passes through toll collection point 300, no data may be transmitted to receiver 315. In examples, camera 325 may take a picture of vehicle 305 as it passes through toll collection point 300. In examples, a "pay-by-mail" system may be used by the regulating company which may run based off a similar concept. The picture may be sent to computing system 320. Computing system 320 may flag the picture of vehicle 305 as belonging to an operator who has not opened an account with the company regulating the toll road and/or who has not payed the toll. The flagged picture may be broadcast to the plurality of nodes 105 (referring to FIG. 1). The plurality of nodes 105 may verify this transaction and update their respective copies of the distributed ledger.

In examples, the operator of a vehicle within a flagged picture still owes the company regulating the toll road a fee for travelling on it. The regulating company may contract out the function of acquiring payments from operators who do not pay the fee to other companies (i.e., collection agencies). In examples, operators who refuse to pay the fee or do not pay within a specified time may be prosecuted. In this particular example, the government and/or law enforcement may become involved. Concerning the present disclosure, the distributed ledger may provide an indisputable record for any party involved in a dispute (i.e., questioning whether or not the operator had passed through a toll collection point 300).

It may be difficult for companies to find information on the operator of the vehicle based on a picture taken of that vehicle. It may take days and/or weeks to process the image, extract useable information, search public databases to find contact information for the operator, and bill the operator. Concerning the present disclosure, the electronic toll data collection management system may reduce time and costs and increase efficiency.

In examples, the electronic toll data collection management system may be accessible to a plurality of nodes 105 (as discussed above). A first node 105 acting on behalf of the regulating company may search through blockchain 200 (referring to FIG. 2) to find information concerning operators who have not paid back the regulating company for accessing the toll road. In examples, first node 105 may act on behalf of another party. In examples, this information may be a flagged picture. First node 105 may de-encrypt the block 205 containing that information. First node 105 may extract that information. First node 105 may enter into a smart contract with a second node 105. In examples, second node 105 may act on behalf of a government agency. First node 105 may request that second node 105 use the extracted information to match it with other information. In examples, first node 105 may request second node 105 to acquire a specific operator's contact information and permanent address. Without limitation, other information may be requested if required by the regulating company. Second node 105 may run the extracted information through an external database. In examples, the external database may contain data matching that of the extracted information. The matching data may provide additional information that the first node 105 had requested. Second node 105 may broadcast this additional information to blockchain 200. The plurality of nodes 105 may verify this transaction and update their respective copies of the distributed ledger. First node 105 may now be able to contact an operator of a vehicle within a flagged picture by utilizing this new data.

In examples, first node 105 may enter into a smart contract with second node 105 prior to extracting information from a block. The agreed upon terms may allow second node 105 to parse through blockchain 200 (referring to FIG. 2) to gather the information to be run in an external database. Second node 105 may be granted access to de-encrypt the relevant block 205. Second node 105 may extract the information to be run in the external database. In examples, second node 105 may fulfill the terms of the smart contract as previously discussed.

In examples, an operator of vehicle 305 may not need to create an account with the company regulating the toll road. There may be a barrier (not illustrated) blocking a road lane. The barrier may not permit the operator of vehicle 305 from passing through unless physical currency is deposited at toll collection point 300. In examples, as the operator deposits physical currency at toll collection point 300, computing system 320 may record this transaction. Computing system 320 may move the barrier blocking the road lane so as to allow the operator of vehicle 305 to pass through. Computing system 320 may broadcast the deposit of physical currency and/or the raising of the barrier to the plurality of nodes 105 (referring to FIG. 1) within the electronic toll data collection management system. The plurality of nodes 105 may verify this transaction and update their respective copies of the distributed ledger.

In examples, the distributed ledger may be categorized by type of input data. In alternative examples, the distributed ledger may be a single blockchain 200 (referring to FIG. 2) that includes all data. Separate blockchains 200 (referring to FIG. 2) may be created to represent data within specific categories. Without limitation, some of these categories may be an operator's financial information, the transmitted data received from transmitter 310, vehicle information, and/or combinations thereof. In examples, some blockchains 200 may only be accessed by the government and/or law enforcement agencies. In examples, a separate blockchain (referring to FIG. 2) may be utilized specifically for maintaining records on operators of vehicles 305 who have not paid tolls as they pass through toll collection points 300. In examples, a separate blockchain 200 (referring to FIG. 2) may be utilized to utilize data provided by law enforcement agencies and/or the government. Nodes 105 (referring to FIG. 1) operating under law enforcement agencies and/or the government may be granted access within a smart contract to use data related to violators who do not pay the toll and/or may be able to input data from their own databases into the blockchain 200. In examples, the regulating company may interact with law enforcement and/or the government through the distributed ledger.

As previously discussed, first node 105 and second node 105 may enter into a smart contract to acquire missing information and/or to match data together. In previous examples, first node 105 may extract specific data from blockchain 200 (referring to FIG. 2) and provide that data to second node 105. Second node 105 may then search external databases for matching data and upload the matched data to blockchain 200 (referring to FIG. 2) so first node 105 may have access. In other previous examples, second node 105 may extract specific data from blockchain 200 (referring to FIG. 2), search external databases for a match, and upload matched data to blockchain 200 (referring to FIG. 2). In alternative examples, first node may parse through a first blockchain 200, de-encrypt the appropriate block 205 (referring to FIG. 2), extract the relevant data, and provide that data to second node 105. Second node 105 may then parse through a second blockchain 200 to find matching data, de-encrypt the appropriate block 205 (referring to FIG. 2), extract the matching data and/or any relevant information, and provide that data to first node 105. In alternative examples, second node 105 may parse through the first blockchain 200 that contains the data to be utilized and may parse through the second blockchain 200 to find matching data. Second node 105 may locate the appropriate block 205 (referring to FIG. 2), de-encrypt it, extract the relevant data, and provide it to first node 105. First node 105 may transfer that data to a separate blockchain 200. First node 105 and/or second node 105 may broadcast the matched data to a separate blockchain 200. The plurality of nodes 105 (referring to FIG. 1) may verify this transaction and update their respective copies of the distributed ledger.

Although the present invention and its advantages have been described in detail, it should be understood that various changes, substitutions and alterations may be made herein without departing from the spirit and scope of the invention as defined by the appended claims.

What is claimed is:

1. An electronic toll data collection management system, comprising:
   a plurality of nodes, wherein at least one of the plurality of nodes is a toll collection point, wherein the toll collection point comprises:
      a computing system;
      a camera; and
      a receiver, wherein the receiver is configured to actuate a nearby transmitter through radio-frequency identification, wherein the transmitter is configured to transmit data to the receiver;
   wherein the computing system is configured to:
      flag an image captured by the camera;
      broadcast the flagged image as data to the plurality of nodes; and
      broadcast the transmitted data to the plurality of nodes;
   wherein each of the plurality of nodes comprises a processor, a memory unit, and a bus, wherein each of the plurality of nodes is connected to each other over a communication network, wherein each of the plurality of nodes has access to a copy of a distributed ledger, wherein the processor of each of the plurality of nodes is configured to:
      utilize blockchain protocols to verify and record a transaction occurring within the distributed ledger, wherein data is recorded as a block, wherein a blockchain is formed by the addition of blocks, wherein each block is encrypted by a mathematical formula that produces a hash value, wherein each block is linked to a previous block by the hash value of the previous block, wherein a consensus must be reached to update the distributed ledger with the addition of a new block;
      parse through the blockchain to locate the block containing the data from the flagged image, de-encrypt the block, and extract the data;
      perform automated vehicle identification protocols on the extracted data to determine a license plate number of the vehicle in the flagged image; and
      parse through the blockchain to match the license plate number from the flagged image with the transmitted data from the transmitter.

2. The electronic toll data collection management system of claim 1, further comprising a transmitter.

3. The electronic toll data collection management system of claim 2, wherein the transmitter transmits data as electromagnetic waves to the receiver, wherein the receiver processes the electromagnetic waves as electrical currents, where the receiver sends the electrical currents to the computing system.

4. The electronic toll data collection management system of claim 3, wherein the transmitted data is vehicle make and model, vehicle registration number, year of vehicle manufacture, license plate number, driver's license number, operator contact information, billing information for the operator, operator permanent address, and/or combinations thereof.

5. The electronic toll data collection management system of claim 3, wherein the plurality of nodes verify the transmitted data by a protocol employing proof-of-work, proof-of-stake, or proof of-authority to reach consensus.

6. The electronic toll data collection management system of claim 5, wherein the plurality of nodes update the distributed ledger by adding a new block containing the verified data to the blockchain.

7. The electronic toll data collection management system of claim 1, wherein each one of the plurality of nodes uses smart contracts for transactions.

8. The electronic toll data collection management system of claim 7, wherein the smart contracts are self-executing.

9. The electronic toll data collection management system of claim 1, wherein the distributed ledger includes multiple blockchains.

10. The electronic toll data collection management system of claim 9, wherein the multiple blockchains are categorized based on input data for the blocks.

11. The electronic toll data collection management system of claim 1, wherein the mathematical formula is a hash function, wherein the hash function produces the hash value, wherein the hash value is a bit string with a fixed length.

12. A method of identifying an operator of a vehicle, comprising:
  capturing, by a camera, an image of the vehicle as it passes through a toll collection point;
  flagging the image, by a computing system;
  broadcasting, by the computing system, the flagged image as data to a plurality of nodes;
  transmitting data from a transmitter to a receiver disposed at the toll collection point;
  broadcasting, by the computing system, the transmitted data to the plurality of nodes, wherein each of the plurality of nodes comprises a processor, a memory unit, and a bus, wherein each of the plurality of nodes is connected to each other over a communication network, wherein each of the plurality of nodes has access to a copy of a distributed ledger, wherein the plurality of nodes utilize blockchain protocols to verify and record a transaction occurring within the distributed ledger, wherein each transaction is recorded as a block in the distributed ledger, wherein a blockchain is formed by the addition of blocks;
  parsing through the blockchain to locate the block containing the data from the flagged image, de-encrypting the block, and extracting the data;
  performing automated vehicle identification protocols on the extracted data to determine a license plate number of the vehicle in the flagged image;
  parsing through the blockchain to match the license plate number from the flagged image with the transmitted data from the transmitter;
  encrypting a new block indicating a debit to an account of the operator of the vehicle having the extracted license plate number, wherein the account is identifiable through the transmitted data from the transmitter; and
  adding the new block to the blockchain.

13. The method of claim 12, wherein the plurality of nodes update their respective copies of the distributed ledger after the addition of the new block.

14. The method of claim 12, further comprising a first node and a second node, wherein the first node operates under a regulating company of a toll road, wherein the second node operates under a government agency.

15. The method of claim 14, wherein the first node enters into a smart contract with the second node.

16. The method of claim 14, wherein the second node searches an external database with the extracted data to find matching data, wherein the second node broadcasts the matching data to the plurality of nodes, wherein the first node accesses the matching data within the distributed ledger.

17. The method of claim 14, wherein the second node searches a second blockchain with the extracted data to find matching data, wherein the second node broadcasts the matching data to the plurality of nodes, wherein the first node accesses the matching data within the distributed ledger.

* * * * *